United States Patent [19]
Kobayashi et al.

[11] Patent Number: 5,411,395
[45] Date of Patent: May 2, 1995

[54] FUEL JET BURNER

[75] Inventors: Hisashi Kobayashi, Putnam Valley; Arthur W. Francis, Jr., Monroe, both of N.Y.

[73] Assignee: Praxair Technology, Inc., Danbury, Conn.

[21] Appl. No.: 150,908

[22] Filed: Nov. 12, 1993

Related U.S. Application Data

[62] Division of Ser. No. 893,830, Jun. 4, 1992, Pat. No. 5,267,850.

[51] Int. Cl.⁶ .................................................. F23C 7/00
[52] U.S. Cl. ............................................ 431/187; 431/8
[58] Field of Search ................... 431/187, 188, 8, 10

[56] References Cited

U.S. PATENT DOCUMENTS

| | | | |
|---|---|---|---|
| 2,138,998 | 12/1938 | Brosius | 158/7 |
| 4,690,635 | 9/1987 | Coppin | 431/187 |
| 4,797,087 | 1/1989 | Gitman | 431/10 |
| 4,986,748 | 1/1991 | Brown et al. | 431/188 |
| 5,100,313 | 3/1992 | Anderson et al. | 431/8 |
| 5,209,656 | 5/1993 | Kobayashi et al. | 431/187 |
| 5,256,058 | 10/1993 | Slavejkov et al. | 431/8 |

Primary Examiner—Carroll B. Dority
Attorney, Agent, or Firm—Stanley Ktorides

[57] ABSTRACT

A burner system and combustion method for high temperature applications employing a high velocity central fuel stream and a low velocity annular coaxial oxidant stream to carry out stable steady combustion in an expanding combusting stream within a cavity stably attached to the fuel nozzle so as to prevent combustion zone furnace gases from entering the cavity.

6 Claims, 1 Drawing Sheet

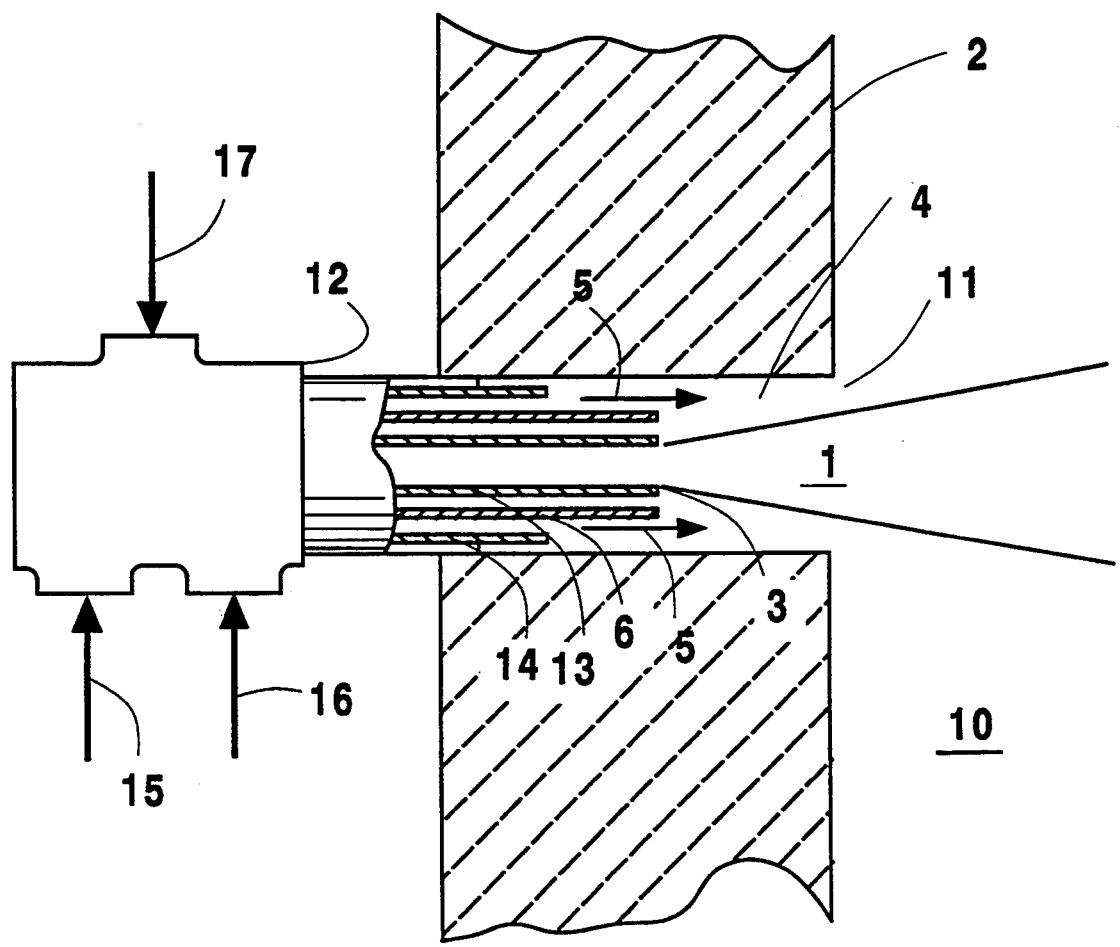

FUEL JET BURNER

This application is a division of prior U.S. application: Ser. No. 893,830, Filing date Jun. 4, 1992, now U.S. Pat. No. 5,267,850.

TECHNICAL FIELD
BACKGROUND ART

High temperature combustion is often employed in many industrial processes such as in glassmelting. Corrosion and fouling of burner nozzles are common problems in high temperature industrial processes. Water cooling of metallic nozzles is often used to prevent high temperature corrosion or melting. Although water cooling is effective in a relatively clean furnace atmosphere, it adds to the complexity of the combustion system and also could escalate the corrosion and fouling problem when the furnace atmosphere contains condensible vapors. Ceramic nozzles have been proposed for use with high temperature combustion as a way for avoiding water cooling. However, presently available ceramic nozzles tend to develop cracks due to thermal and other stresses and are not considered dependable for many industrial applications. The problem of designing a non-water cooled burner is particularly severe where the burner employs oxygen or oxygen-enriched air rather than air as the oxidant because of the high flame temperature generated.

Accordingly, it is an object of this invention to provide a metallic nozzle type combustion system which may be effectively employed with high temperature combustion without the need for water cooling.

It is another object of this invention to provide a metallic nozzle type combustion system which can be used with oxygen or oxygen-enriched air as the oxidant to carry out high temperature combustion without the need for water cooling.

SUMMARY OF THE INVENTION

The above and other objects which will become apparent to one skilled in the art upon a reading of this disclosure are attained by the present invention, one aspect of which is:

A combustion method for carrying out high temperature combustion comprising:
(A) providing a substantially cylindrical cavity having an opening with a diameter D communicating with a combustion zone containing furnace gases;
(B) injecting a fuel stream through a nozzle into the cavity at a point recessed from the opening at a high velocity not less than 200 feet per second, said recess having a length L such that L/D is at least 1.0 but not more than 4.0;
(C) injecting oxidant having an oxygen concentration of at least 30 percent into the cavity in an annular stream coaxially with the fuel stream at a low velocity not more than 100 feet per second;
(D) establishing a stable flame attached to the nozzle while combusting fuel and oxidant in an expanding stream within the cavity and passing the combusting stream into the combustion zone to produce furnace gases; and
(E) maintaining furnace gases outside the cavity and entraining furnace gases into the combusting stream within the combustion zone.

Another aspect of the invention is:

A fuel jet burner system comprising:
(A) a substantially cylindrical cavity within a combustion zone wall having an opening D communicating with the combustion zone;
(B) a central conduit having a nozzle for injecting a high velocity fuel stream into the cavity toward the opening said central conduit and nozzle communicating with a source of fuel and having a tip positioned at a recess from the opening, said recess having a length L such that L/D is at least 1.0 but not more than 4.0; and
(C) an annular injector for providing low velocity oxidant into the cavity coaxially with the central conduit and nozzle, said annular injector communicating with a source of oxidant having an oxygen concentration of at least 30 percent.

BRIEF DESCRIPTION OF THE DRAWING

The sole FIGURE is a view partly in cross-section of one preferred embodiment of the low velocity fuel jet burner of this invention.

DETAILED DESCRIPTION

The invention will be described in detail with reference to the Drawing.

Referring now to the FIGURE, refractory wall 2 borders combustion zone 10 wherein there is contained a furnace atmosphere comprising furnace gases such as, for example, carbon dioxide, water vapor, nitrogen and/or oxygen. The furnace atmosphere is generally at an elevated temperature typically exceeding 1000° F. and may be as high as 3000° F. or more. The furnace atmosphere may also contain particulate matter, such as glass batch materials or ash from coal combustion, and/or condensible vapors such as sodium species or acid vapors.

Within refractory wall 2 there is provided substantially cylindrical cavity 4 which communicates with combustion zone 10 at opening 11 which has a diameter D. Generally, opening 11 will have a diameter D within the range of from 0.25 to 10 inches. Burner 12 is positioned for injecting fuel and oxidant into cavity 4. Burner 12 comprises central conduit 13 and annular conduit or injector 14 which runs coaxially with central conduit 13. Nozzle 3 is positioned on the end of conduit 13 within cavity 4 so as to inject a fuel stream or jet from nozzle 3 in a direction toward opening 11 and then into combustion zone 10. The tip of nozzle 3 is recessed from opening 11 by a distance L such that L/D is at least 1.0 but not more than 4.0. Preferably L/D is within the range of from 2.0 to 3.0. The recess of nozzle 3 is sufficient to protect nozzle 3 from damage due to the conditions within combustion zone 10 while not being so great as to cause fuel jet or combustion stream 1 to expand into the walls of cavity 4 prior to entering into combustion zone 10. The most suitable recess will depend upon the furnace temperature; the higher is the furnace temperature the greater would be the recess.

Nozzle 3 has a small diameter, generally less than 0.5 times the diameter D of opening 11 and usually within the range of from 0.05 to 0.5 times the diameter D of opening 11. In this way the fuel is injected out nozzle 3 at a high velocity not less than 200 feet per second and generally within the range of from 200 to 2000 feet per second. The fuel may be any gas which contains combustibles which may combust in the combustion zone. Among such fuels one can name natural gas, coke oven gas, propane, hydrogen, atomized oil and methane. The fuel is provided to burner 12 from fuel source 15 from which it is passed through burner 12 into cavity 4.

Oxidant is injected into cavity 4 in an annular stream 5 coaxially with the fuel stream from annular injector 14. The oxidant is oxygen-enriched air having an oxygen concentration of at least 30 percent, preferably at least 90 percent, or technically pure oxygen having an oxygen concentration of at least 99.5 percent. The embodiment illustrated in the FIGURE is a preferred embodiment wherein the annular injector injects the oxidant into the cavity 4 at a point further recessed from opening 11 than is the tip of nozzle 3. The oxidant is provided to burner 12 from oxidant source 16 from which it is passed through burner 12 into cavity 4. The annular or coaxial oxidant stream 5 is injected into cavity 4 at a low velocity not more than 100 feet per second and generally within the range of from 5 to 100, preferably 10 to 50, feet per second.

The embodiment illustrated in the FIGURE also employs a second annular or coaxial conduit 6 positioned between central conduit 13 and annular coaxial injector conduit 14. Conduit 6 provides cooling air from air source 17 through burner 12 and into cavity 4. The cooling air is employed to cool the burner system when it is shut down in a hot furnace. It can also provide additional oxidant for combustion. Conduit 6 may also be used to provide additional fuel for combustion.

Central fuel conduit 13 is metallic and is preferably made of copper to enable heat to be readily conducted away from nozzle 3. Nozzle 3 is made of a high temperature alloy such as stainless steel. Annular coaxial conduit 14 is preferably made of copper with a stainless steel section on the open end.

In operation the fuel is injected into cavity 4 through central conduit 13 and nozzle 3 as a high velocity stream. Oxidant is injected into cavity 4 through annular coaxial conduit 14 as low velocity annular coaxial stream 5. The oxidant and fuel combust within cavity 4. Because of the low velocity of the oxidant relative to the fuel, the resulting mixture and combustion is stable. A stable fuel-oxidant flame 1 is attached to fuel nozzle 3, expands slowly and extends out of cavity 4 through opening 11 into combustion zone 10 wherein combustion continues producing heat and furnace gases. By attached to the nozzle it is meant that the flame is adjacent the nozzle and is not moved away from the nozzle as in conventional high velocity practice. The attachment of the flame to the fuel nozzle enhances the stability of the flame. The attachment is brought about by the low velocity annular coaxial oxygen-enriched oxidant despite the high velocity of the fuel. The resulting stable flame and the steady expansion of the combusting stream 1 within cavity 4 serve to substantially maintain furnace gases outside cavity 4 and substantially prevent furnace gases from becoming entrained within cavity 4 despite the large recess between opening 11 and nozzle 3. By taking advantage of the reacting combusting stream's substantially lower rate of entrainment of surrounding gases compared with a non-reacting stream, the burner system, particularly the nozzle, is protected from damage despite high combustion zone temperatures and the presence of corrosive or condensible species within the furnace gases. Thus, furnace gases are maintained outside the cavity despite the high velocity of the fuel stream. Outside of cavity 4 within combustion zone 10, the high velocity of the combusting stream causes furnace gases to aspirate into or become entrained within the combusting stream.

The following example is provided for illustrative purposes and is not intended to be limiting. A burner system similar to that illustrated in the FIGURE was employed and fired with 1000 SCFH of natural gas and 2000 SCFH of technically pure oxygen. The burner system employed a stainless steel central fuel tube and a copper annular coaxial oxidant injector with a one inch long stainless steel section on the injection end. The burner system also employed an intermediate annular coaxial cooling air conduit and 300 SCFH of cooling air was used in carrying out the example. The cavity was cylindrical having an inside diameter of 2.5 inches. The stainless steel fuel nozzle tip was recessed from the opening a distance of 5.0 inches. The oxidant injector tip was recessed further from the opening than was the fuel nozzle tip. The oxidant injector injected the oxidant into the cavity at a point recessed 7.0 inches from the opening of the cavity into the combustion zone.

The fuel employed was natural gas comprising methane and the oxidant employed was technically pure oxygen. The fuel was injected from the nozzle into the cavity in a central stream at a velocity of 210 feet per second and the oxidant was injected from the annular coaxial injector into the cavity in an annular coaxial stream at a velocity of 33 feet per second and combustion was carried out in a steady expanding stream within the cavity. The combusting stream was passed from the cavity into the combustion zone and furnace gases were maintained outside the cavity while being entrained into the combusting stream in the combustion zone. The temperature within the combustion zone was 2800° F. Thermocouples on the stainless steel nozzle and on the copper conduit recorded temperatures of 600° F. and 208° F. respectively, demonstrating the effective high temperature protection of the burner system and combustion method of the invention.

Although the invention has been described in detail with reference to one preferred embodiment, those skilled in the art will recognize that there are other embodiments of the invention within the spirit and the scope of the claims.

We claim:

1. A fuel jet burner system comprising:
   (A) a substantially cylindrical cavity within a combustion zone wall having an opening with a diameter D communicating with the combustion zone;
   (B) a central conduit having a nozzle for injecting a high velocity fuel stream at a velocity not less than 200 feet per second into the cavity toward the opening said central conduit and nozzle communicating with a source of fuel and having a tip positioned at a recess from the opening, said recess having a length L such that L/D is at least 1.0 but not more than 4.0; and
   (C) an annular injector for providing low velocity oxidant at a velocity not more than 100 feet per second into the cavity coaxially with the central conduit and nozzle, said annular injector communicating with a source of oxidant having an oxygen concentration of at least 30 percent, said cylindrical cavity, central conduit and annular injector establishing a stable flame attached to the nozzle.

2. The burner system of claim 1 wherein the cavity has a cylindrical configuration.

3. The burner system of claim 1 wherein the opening has a diameter D within the range of from 0.25 to 10 inches.

4. The burner system of claim 1 wherein the annual injector is further recessed from the opening than is the nozzle tip.

5. The burner system of claim 1 wherein the central conduit is comprised of copper and the nozzle is comprised of stainless steel.

6. A fuel jet burner system comprising:
  (A) a substantially cylindrical cavity within a combustion zone wall having an opening with a diameter D communicating with the combustion zone;
  (B) a central conduit having a nozzle for injecting a high velocity fuel stream at a velocity not less than 200 feet per second into the cavity toward the opening said central conduit and nozzle communicating with a source of fuel and having a tip positioned at a recess from the opening, said recess having a length L such that L/D is at least 1.0 but not more than 4.0;
  (C) an annular injector for providing low velocity oxidant at a velocity not more than 100 feet per second into the cavity coaxially with the central conduit and nozzle, said annual injector communicating with a source of oxidant having an oxygen concentration of at least 30 percent, said cylindrical cavity, central conduit and annular injector establishing a stable flame attached to the nozzle; and
  (D) a second annular coaxial passageway formed between the central conduit and the annular injector.

* * * * *